United States Patent [19]

Macdonald et al.

[11] Patent Number: 4,596,153
[45] Date of Patent: Jun. 24, 1986

[54] VANE FOR USE IN MONITORING FLOW OF A FLUID

[75] Inventors: George A. Macdonald, Chelmsford; Charles R. Jarvis, Hockley; Roger M. Langdon, Colchester, all of England

[73] Assignee: The Marconi Company Limited, Stanmore, England

[21] Appl. No.: 562,750

[22] Filed: Dec. 19, 1983

[30] Foreign Application Priority Data

Dec. 17, 1982 [GB] United Kingdom ............... 8236028

[51] Int. Cl.⁴ .............................................. G01F 1/20
[52] U.S. Cl. .................... 73/861.18; 310/321; 310/330
[58] Field of Search ........... 73/861.18, 861.21, 861.36, 73/861.37, 861.74, 272 R; 310/321, 328, 330, 346, 359; 29/25.35

[56] References Cited

U.S. PATENT DOCUMENTS 2,168,943  8/1939  Pfundt ........................... 29/25.35 X
2,618,579 11/1952  Brajer ............................. 29/25.35
3,218,851 11/1965  Sipin ............................. 73/861.37

FOREIGN PATENT DOCUMENTS 2393275 12/1978  France .
1266144  3/1972  United Kingdom .
1581975 12/1980  United Kingdom .
2052919  1/1981  United Kingdom .
2071848  1/1981  United Kingdom .

Primary Examiner—Herbert Goldstein
Attorney, Agent, or Firm—Spencer & Frank

[57] ABSTRACT

A flowmeter has a vane which is caused to vibrate at one of its resonant frequencies and a flexure standing wave set up along it. Two piezoelectric sensors are used to monitor characteristics of the standing wave and hence the mass flow rate of a fluid flowing past the vane along a pipe.

The vane comprises a ceramic planar member on which a conductive ceramic ink is laid down to form tracks. The ink also bonds a ceramic piezoelectric transducer to the member to drive and maintain it in vibration. A non-conductive layer is laid down on the surface of the member covering the conductive tracks surrounding the transducer. A metal layer forms the external surface of the vane and acts as a ground plane for the transducer.

16 Claims, 3 Drawing Figures

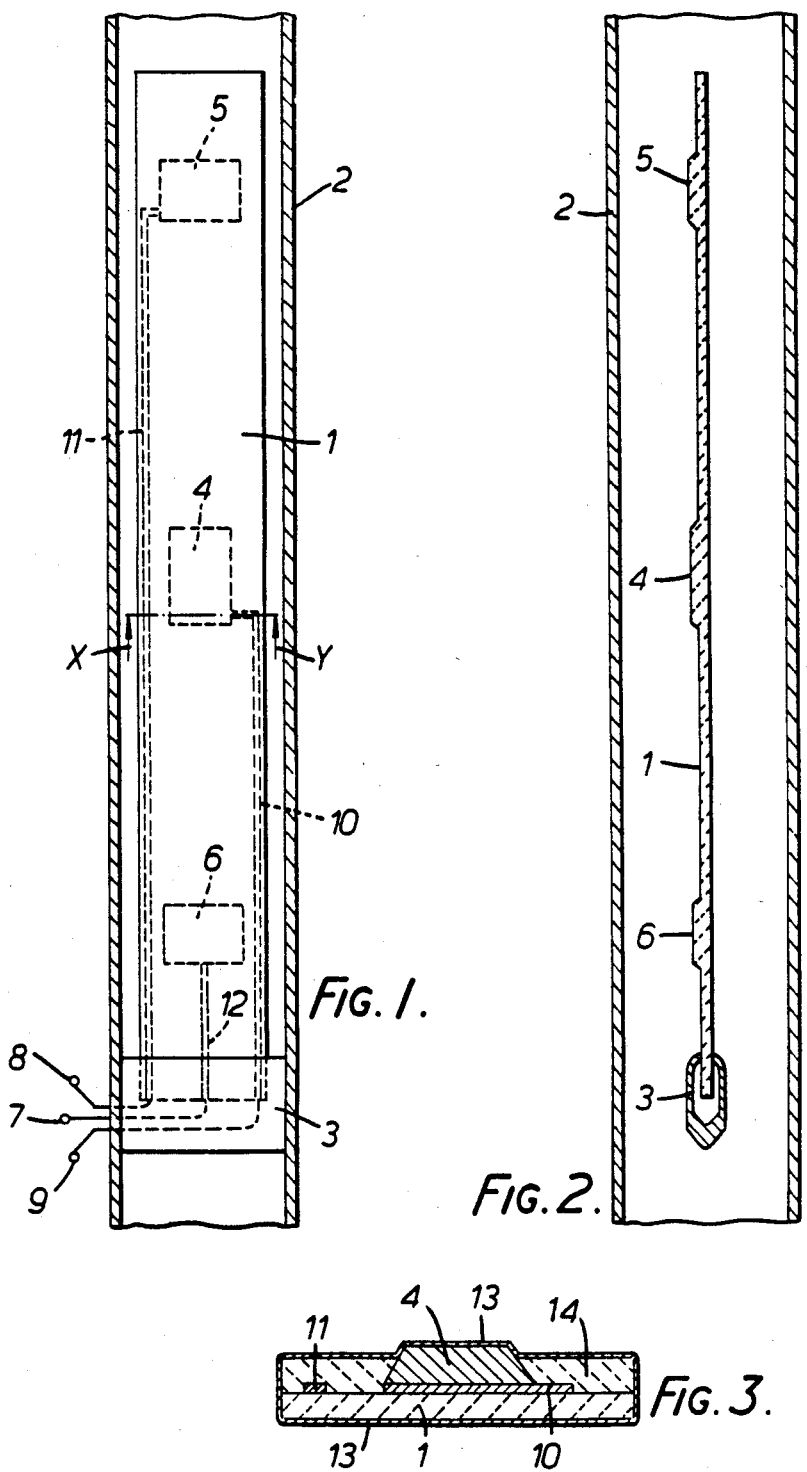

VANE FOR USE IN MONITORING FLOW OF A FLUID

BACKGROUND OF THE INVENTION

This invention relates to a vane for use in monitoring flow of a fluid.

A previously proposed flowmeter has a vane positioned in a tube along which a fluid flows. The vane is caused to vibrate at one of its resonant frequencies and a flexure standing wave set up along it. A piezoelectric sensor is used to monitor the characteristics of the standing wave so as to determine the mass flow rate of the fluid. One example of such a flowmeter is disclosed in our U.K. patent application No. 2071848. This invention relates to a vane which is particularly suitable for use with such a flowmeter.

SUMMARY OF THE INVENTION

It is an object of this invention to provide an improved vane for use in monitoring flow of a fluid.

According to one aspect of this invention there is provided a vane for use in monitoring flow of a fluid comprising: a member capable of supporting a flexural vibration and composed of a first ceramic material; a piezoelectric transducer composed of a second ceramic material; and a third ceramic material positioned between the transducer and said member so as to bond the transducer firmly to the member.

Although the first, second and third ceramic materials are, in general, different compounds, they are compatible with each other over a large temperature range because of their similar composition. A vane of ceramic materials can be of light weight and thus able to exhibit a high sensitivity to flow rate even for fluids, such as gases, having low densities. The ceramic materials also have low temperature coefficients of elasticity and expansion, and unlike organic materials, for example an epoxy resin, they do not age appreciably over a length of time. These properties enable a flowmeter using the vane to give an accurate and repeatable indication of flow rate over a wide temperature range.

Preferably at least a region of said third ceramic material may be conductive, so as to provide an electrical path to one face of the transducer. This material may itself constitute one of the transducer electrodes. The conductive ceramic material may be used to provide connections and conductive tracks to the piezoelectric transducer as well as providing a bonding material to attach the transducer to the member.

The transducer is used to sense the vibration of said member. In practice, two such transducers would be used to monitor the phase difference of the vibration at two separate locations along the member.

It is preferred that a piezoelectric transducer of the second ceramic material is mounted on said member to drive and maintain the member in vibration.

It is also preferred that a metal layer covers the ceramic materials and forms the external surface of the vane. This layer protects the ceramic materials from the adverse effect of chemicals which might come into contact with the vane. Choice of metal enables the vane to be easily inserted in position by soldering it into its mounting. The metal also conveniently acts as a ground plane for transducers on the member.

According to a feature of this invention a flowmeter includes a vane as described above.

According to a further aspect of this invention a method of manufacturing a vane which is in accordance with said first aspect includes the steps of: applying said third ceramic material in the form of a fluid to the surface of the member; placing the transducer on said third ceramic material; and fusing said third ceramic material, which on solidifying bonds the transducer to the member.

BRIEF DESCRIPTION OF THE DRAWINGS

The invention will now be further described by way of example with reference to the accompanying drawing in which:

FIG. 1 is a schematic sectional view of a vane in accordance with the invention and part of a tube in which it is mounted and through which fluid flows;

FIG. 2 is another sectional view of the vane shown in FIG. 1; and

FIG. 3 is a transverse section of part of the vane taken on line XY.

DETAILED DESCRIPTION OF THE DRAWINGS

With reference to the drawings, a vane forming part of a flowmeter includes a member 1 which is mounted in cylindrical tube 2 through which a fluid flows. Three ceramic piezoelectric transducers, 4, 5 and 6 are attached to one face of the member 1. The member 1 is 2.5 cm wide and extends across most of the tube 2, is thin, being about 0.5 mm thick, and has a length of about 15 cm along the axis of the tube 2 which is several times the diameter of the tube 2. It is held at one end by a support 3 which is sufficiently thin so as to give low resistance to fluid flow, and which is fixed to the wall of the tube 2 at each end of a diameter. The other end of the member 1 is not fixed, and is free to vibrate. Alternatively, both ends may be fixed.

The member 1 is composed of a ceramic material and is capable of flexural vibration. A material suitable for the member 1 is Macor Code 9658 obtainable from William McGeoch & Co. (Birmingham) Ltd. The ceramic piezoelectric transducer 4 is positioned on the member 1 about halfway along its length, and in operation drives and maintains the member 1 in vibration. The two ceramic piezoelectric transducers 5 and 6 are attached to the member 1, one being near the fixed end and one near the free end. They sense bending of the member 1, and enable the phase of the flexure wave at the transducers 5 and 6 to be determined. The mass flow rate of the fluid may be determined from the electrical signals generated at these transducers 5 and 6.

The transducers 5 and 6 produce output voltages at terminals 7 and 8 proportional to the inverse bending radius of the member 1 at the points of attachment. The output of one of the transducers 5 is applied to a phase-sensitive detector which compares the output in phase with the output from a voltage controlled oscillator supplying the signal to the driving transducer 4. If these two signals are not exactly in phase, an error signal proportional to the phase difference is generated by the phase-sensitive detector and is fed via a low pass filter to the frequency control input of the oscillator, thus ensuring that the oscillator is maintained at a frequency which produces a fixed predetermined phase difference between the signal applied to the transducer 4 and the output signal obtained from transducer 5.

A signal indicative of the mass flow rate of the fluid flowing past the member 1 is obtained by applying sinusoidal output signals from transducers 5 and 6 to respective squaring circuits, which operate to generate two corresponding pulse trains. The time difference between corresponding edges of the square pulses is measured at a counter. the measured time difference is proportional to the mass flow rate of the fluid.

The three transducers 4, 5 and 6 ar connected to terminals, 7, 8 and 9 respectively by conductive tracks 10, 11 and 12 printed on the surface of the ceramic member 1. A further layer 14 of non-conductive ceramic material covers the tracks 10, 11, 12 and usually also those regions of the member which do not carry a transducer.

The member 1, the transducers 4, 5 and 6 and the conductive and non-conductive ceramic layers are covered by a thin metal coating 13 which acts as a ground plane for the transducers. The flowmeter can be used to monitor the flow of corrosive fluids, or fluid which would adversely affect the ceramic materials. The coating 13 prevents contact between the fluid and any of the ceramic materials.

In manufacturing the vane, the conductive tracks 10, 11 and 12 are first laid down on one surface of the member 1. These are derived from a ceramic ink which is printed on to the member. The ink may be for example EMCA Silver 92 which is a fine glass powder and a fine metal powder suspended in two organic solvents, and is applied to the surface of the member 1 as a fluid.

The transducers 4, 5 and 6 are bonded to the member 1 by the ceramic conductive ink by placing them on areas of the ink whilst it is wet, applying a small amount of pressure and drying and firing the ink. The ink is dried at about 120° C. to drive off the first solvent and then fired at a temperature of about 500° C.–600° C., causing the second solvent to be driven off and the glass power to fuse, giving a continuous ceramic layer, which forms a glass-like bond. When piezoelectric transducers are acquired, they normally already have electrodes which may, for example, be of metal or of fused conductive ink, similar to that used for the conductive tracks 10, 11 and 12. However, if electrodes are not already present they do not need to be added, since the bonding material and the metal layer act as electrodes.

The insulating layer 14, of about 0.1 mm thickness, is then laid down over the conductive tracks 10, 11 and 12 and around the transducers 4, 5 and 6. This layer is a ceramic non-conductive ink. It is similar to the conductive ink but does not include a metal powder, e.g. EMCA Overglaze paste 2274. It is painted on and then dried and fired in the same manner as the conductive ink. Typically, two coats are required to achieve the desired thickness.

The high temperatures at which the inks are fired results in the transducers 4, 5 and 6 losing their piezoelectric effect. This is then restored by applying a field of about 2 kV/mm between the two opposing faces of each transducer at a temperature of 130° C.

The metal coating 13 is applied in a two-stage process: An initial thin coat is laid down by evaporation and then the thickness is built up to a required value by a plating process. Connections are made from the conductive tracks 10, 11 and 12 to terminals 7, 8 and 9, and the vane soldered into the support 3.

We claim:

1. A vane for use in monitoring flow of a fluid comprising: a member capable of supporting a flexural vibration and composed of a firt ceramic material; a piezoelectric transducer composed of a second ceramic material that is different from said first ceramic material; and a third ceramic material positioned between the transducer and said member so as to bond the transducer firmly to the member.

2. A vane as claimed in claim 1 and wherein at least a region of said third ceramic material is conductive, and is arranged to provide an electrical path to one face of said transducer.

3. A vane as claimed in claim 1 and wherein two piezoelectric transducers are provided for the purpose of monitoring the phase difference of the flexural vibration at two separate locations along the member.

4. A vane as claimed in claim 1 and wherein another piezoelectric transducer of the second ceramic material is mounted on said member to drive and maintain said member in vibration.

5. A vane as claimed in claim 1 and wherein a metal layer covers the ceramic materials and forms the external surface of the vane.

6. A flowmeter including a vane as claimed in claim 1.

7. A vane for use in monitoring flow of a fluid through a conduit, comprising:
   an elongated member disposed within said conduit and capable of supporting a flexural vibration, said elongated member being composed of an insulating ceramic material and having a first end and a second end;
   a piezoelectric transducer composed of a ceramic material having a composition different from that of said elongated member, said transducer having a length that is substantially less than the length of said elongated member; and
   a conductive element which is affixed to said elongated member and which is composed of a ceramic material having a composition different from that of said elongated member and that of said transducer, said conductive element having a bonding portion which is disposed between said elongated member and said transducer to bond said transducer to said elongated member, said conductive element additionally having an elongated track portion which is substantially longer than said length of said transducer and which extends toward said first end of said elongated member.

8. The vane of claim 7, wherein said transducer is disposed adjacent said second end of said elongated member, and further comprising another piezoelectric transducer composed of a ceramic material and another conductive element which is affixed to said elongated member and which is composed of a ceramic material, said another conductive element having a bonding portion whih is disposed between said elongated member and said another transducer to bond said another transducer to said elongated member adjacent said first end thereof, said another conductive element additionally having a track portion which extends toward said first end of said elongated member.

9. The vane of claim 8, further comprising a further piezoelectric transducer composed of ceramic material and a further conductive element which is affixed to said elongated member and which is composed of a ceramic material, said further conductive element having a bonding portion which is disposed between said elongated member and said further transducer to bond said further transducer to said elongated member at a position between said transducer and said another transducer, said further conductive element additionally having a track portion which extends toward said first end of said elongated member.

10. The vane of claim 9, further comprising an insulating layer which is composed of a ceramic material, said insulating layer being affixed to said elongated member and covering at least said track portions.

11. The vane of claim 10, wherein portions of said transducers protrude through said insulating layer, and further comprising a metal coating deposited on said elongated member, said insulating layer, and the protruding portions of said transducers.

12. The vane of claim 11, wherein said metal coating has an inner region formed of evaporated metal and an outer region formed of plated metal.

13. The vane of claim 11, wherein said conduit has a support mounted therein, and wherein said metal coating is soldered to said support.

14. The vane of claim 7, further comprising an insulating layer which is composed of ceramic material, said insulating layer being affixed to said elongated member and covering at least said track portion.

15. The vane of claim 14, wherein a portion of said transducer protrudes through said insulating layer, and further comprising a metal coating deposited on said elongted member, said insulating layer, and the protruding portion of said transducer.

16. The vane of claim 15, wherein said conduit has a support mounted therein, and wherein said metal coating is soldered to said support.

* * * * *